(12) United States Patent
Dietz et al.

(10) Patent No.: US 10,267,426 B2
(45) Date of Patent: Apr. 23, 2019

(54) VALVE ASSEMBLY AND METHOD OF OPERATING SAME

(71) Applicant: B/E AEROSPACE, INC., Wellington, FL (US)

(72) Inventors: Stuart A. Dietz, Topeka, KS (US); Brian Rutherford, Stilwell, KS (US)

(73) Assignee: B/E Aerospace, Inc., Wellington, FL (US)

(*) Notice: Subject to any disclaimer, the term of this patent is extended or adjusted under 35 U.S.C. 154(b) by 50 days.

(21) Appl. No.: 15/610,972

(22) Filed: Jun. 1, 2017

(65) Prior Publication Data

US 2017/0350517 A1    Dec. 7, 2017

Related U.S. Application Data

(60) Provisional application No. 62/344,304, filed on Jun. 1, 2016.

(51) Int. Cl.
| | |
|---|---|
| *F16K 11/056* | (2006.01) |
| *A47J 31/46* | (2006.01) |
| *B64D 11/00* | (2006.01) |
| *F16K 31/04* | (2006.01) |
| *F16K 3/18* | (2006.01) |
| *F16K 11/074* | (2006.01) |
| *F16K 11/16* | (2006.01) |

(52) U.S. Cl.
CPC ............ *F16K 11/056* (2013.01); *A47J 31/46* (2013.01); *B64D 11/0007* (2013.01); *F16K 3/18* (2013.01); *F16K 11/0743* (2013.01); *F16K 11/165* (2013.01); *F16K 31/041* (2013.01)

(58) Field of Classification Search
USPC ....................................... 137/630.17, 625.11
See application file for complete search history.

(56) References Cited

U.S. PATENT DOCUMENTS

| | | | | |
|---|---|---|---|---|
| 2,598,605 | A * | 5/1952 | Robinson | A47L 15/42 137/118.03 |
| 2,633,325 | A * | 3/1953 | Whitlock, Jr. | F16K 3/10 137/625.31 |
| 3,116,757 | A * | 1/1964 | Donguy | F16K 11/06 137/625.11 |
| 3,745,884 | A | 7/1973 | Aanstad | |
| 3,972,263 | A | 8/1976 | Welsh, Jr. | |
| 4,398,562 | A * | 8/1983 | Saarem | F16K 31/041 126/585 |
| 4,545,401 | A | 10/1985 | Karpis | |

(Continued)

OTHER PUBLICATIONS

International Search Report and Written Opinion for PCT/US2017/035373 dated Aug. 14, 2017.

*Primary Examiner* — John Fox
(74) *Attorney, Agent, or Firm* — Donna P. Suchy (57) ABSTRACT

A valve assembly has a port selection assembly with an inlet fluid path and a plurality of outlet fluid paths and a servo-driven barrel. The barrel includes a slot that is aligned with the inlet fluid path. The barrel also includes multiple pockets. The valve assembly also includes ball seals, each of which is at least partially disposed within a respective pocket. The rotation of the barrel moves the ball seals to block or unblock one or more of the outlet fluid paths, thereby controlling the flow of fluid from the inlet fluid path, through the slot, and through the outlet fluid path.

14 Claims, 5 Drawing Sheets

(56) References Cited

U.S. PATENT DOCUMENTS

| | | | |
|---|---|---|---|
| 4,870,892 A | 10/1989 | Thomsen et al. | |
| 4,893,650 A * | 1/1990 | Chisholm | F16K 15/044 |
| | | | 137/539 |
| 5,613,511 A * | 3/1997 | Andersen | B05B 1/1636 |
| | | | 134/166 R |
| 6,854,658 B1 | 2/2005 | Houghton et al. | |
| 6,990,999 B2 | 1/2006 | Patel | |
| 7,677,035 B2 | 3/2010 | Plougsgaard et al. | |
| 7,861,740 B2 | 1/2011 | Phallen et al. | |
| 7,918,002 B2 * | 4/2011 | Kissel | F16L 37/0925 |
| | | | 29/237 |
| 8,726,646 B2 | 5/2014 | Riedel et al. | |
| 8,844,568 B2 * | 9/2014 | Pan | F16K 11/072 |
| | | | 137/625.15 |
| 2004/0050432 A1 * | 3/2004 | Breda | E03C 1/023 |
| | | | 137/625.11 |
| 2011/0240152 A1 | 10/2011 | Overgaag | |
| 2012/0328748 A1 | 12/2012 | Doglioni Majer | |
| 2015/0157168 A1 | 6/2015 | Burrows | |
| 2015/0245736 A1 | 9/2015 | Reyhanloo | |
| 2016/0031285 A1 | 2/2016 | Tucker et al. | |

* cited by examiner

VALVE ASSEMBLY AND METHOD OF OPERATING SAME

CROSS-REFERENCE TO RELATED APPLICATIONS

The present application claims the priority benefit of U.S. Provisional Patent Application 62/344,304, filed on Jun. 1, 2016 and incorporated herein by reference.

FIELD OF THE DISCLOSURE

The present disclosure relates generally to valves and, more particularly, to a valve assembly that uses a rotatable barrel to select outlet ports.

BACKGROUND

Designing a beverage maker for an aircraft poses challenges that do not generally occur in ground-based beverage maker designs. Mechanically-actuated beverage makers conventionally use a solenoid/manifold system. However, the solenoid/manifold systems have higher power consumption, increased weight, and higher costs.

DRAWINGS

The features of the present techniques may be best understood from the following detailed description taken in conjunction with the accompanying drawings of which.

DETAILED DESCRIPTION

The following discussion is directed to various exemplary embodiments. However, one possessing ordinary skill in the art will understand that the examples disclosed herein have broad application, and that the discussion of any embodiment is meant only be exemplary of that embodiment, and not intended to suggest that the scope of the disclosure is limited to that embodiment.

Certain terms are used throughout the following description to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

The disclosure is generally directed to a valve assembly and method of operation. The various embodiments may be used in a variety of contexts. For example, the valve assembly could be used in conjunction with a servomotor to control the operation of a beverage maker (e.g., for an aircraft). In the aircraft beverage maker context, a servo-driven valve assembly as described herein would replace the conventional solenoid/manifold systems that are currently used. In one embodiment, software control is used to direct a servomotor to select the appropriate port to direct water through to brew coffee, tea, etc. or to direct hot water to the faucet at the front of a beverage maker. The advantages over a solenoid/manifold system are lower power consumption, less weight, and lower cost. According to an embodiment, a plurality of solenoids is replaced by one servomotor, thereby providing lower cost and greater simplicity.

For the purposes of promoting an understanding of the principles of the disclosure, reference has been made to the embodiments illustrated in the drawings, and specific language has been used to describe these embodiments. However, no limitation of the scope of the disclosure is intended by this specific language, and the disclosure should be construed to encompass all embodiments that would normally occur to one of ordinary skill in the art.

Figure 1:
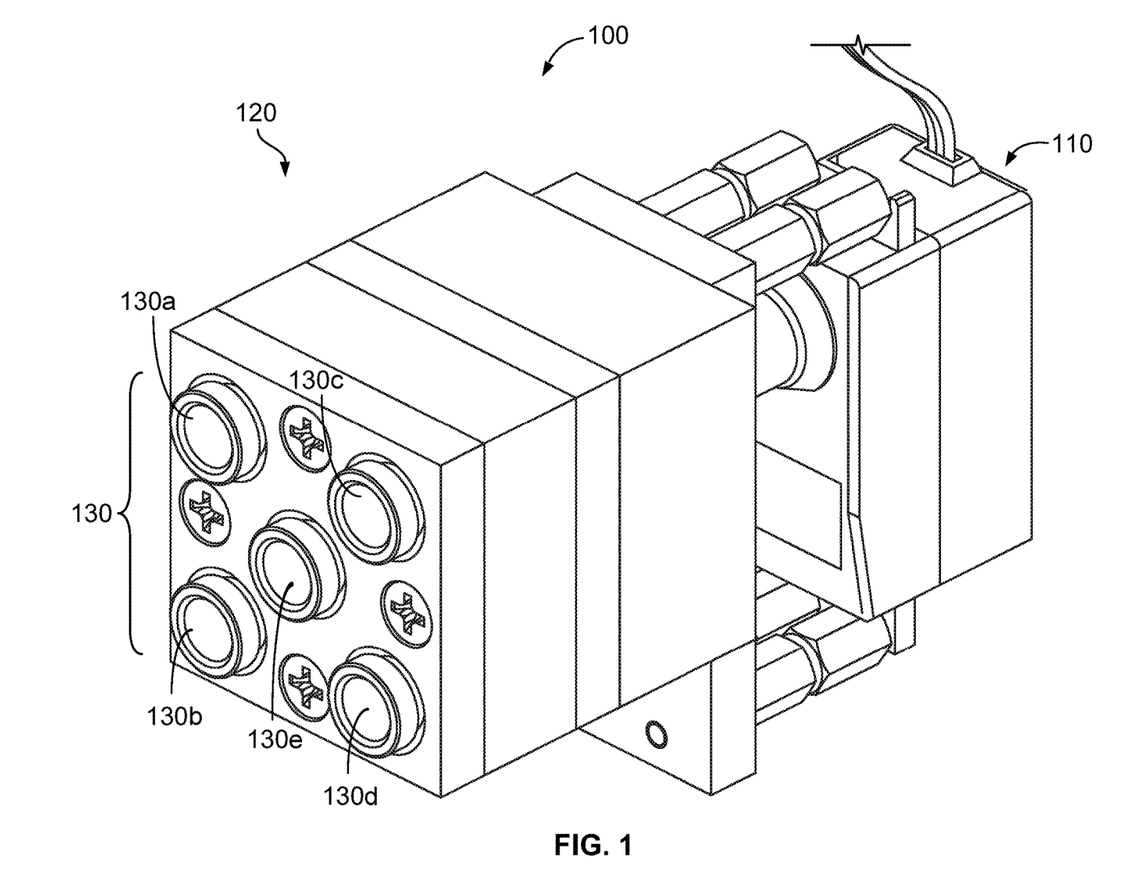
FIG. 1 is an isometric view of a valve assembly configured according to an embodiment.

Turning to FIG. 1, an isometric view of a valve assembly 100 (e.g., for use in an aircraft beverage maker) is illustrated. The valve assembly 100 includes a servo assembly 110 and a port selection assembly 120. According to an embodiment, the front end of the port selection assembly 120 has a plurality of holes or ports 130 therethrough. In the embodiment shown in FIG. 1, there are five ports 130 provided—outlet ports 130a-130d and an inlet port 130e. However, a person skilled in the art would understand that any number of ports or holes may be provided to meet the desired requirements. According to an embodiment, the plurality of ports or holes 130 is arranged as illustrated in FIGS. 1-4. A plurality of fluid flow paths (e.g., water flow paths) are provided in an embodiment. In an embodiment where the valve assembly 100 is used in conjunction with a beverage maker, each of the fluid flow paths carries water and corresponds to one of the plurality of beverage maker functions (e.g., coffee brew, tea brew, hot water, system purge etc.). Furthermore, each of the fluid flow paths is defined within the port selection assembly and communicates with water flow slot/pockets within the port selection assembly 120 (e.g., within the port selection barrel 210 discussed in conjunction with FIG. 2). According to an embodiment, one of the fluid flow paths is an inlet fluid path (e.g., for hot water) and other fluid flow paths are outlet fluid paths (e.g., to supply hot water for beverage maker functions or a purge function).

In an embodiment, the servo assembly 110 includes a servomotor that is controlled by a software program implemented on logic circuitry. The term logic circuitry here means a circuit (a type of electronic hardware) designed to perform complex functions defined in terms of mathematical logic. Examples of logic circuitry include a microprocessor, a controller, an application-specific integrated circuit, and a field-programmable gate array.

Figure 2A:
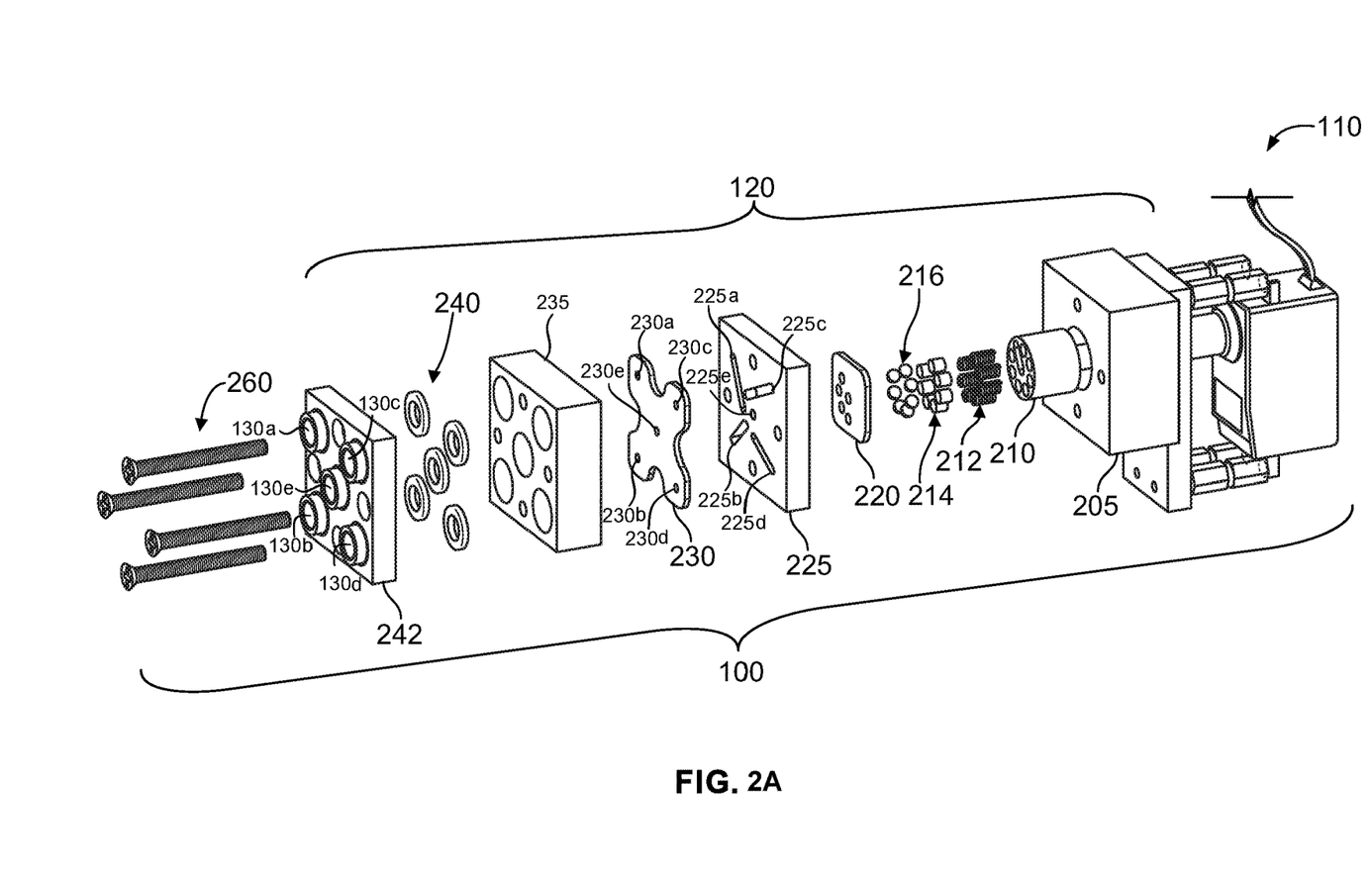
FIG. 2A is an exploded view of the valve assembly according to an embodiment.
Figure 2B:
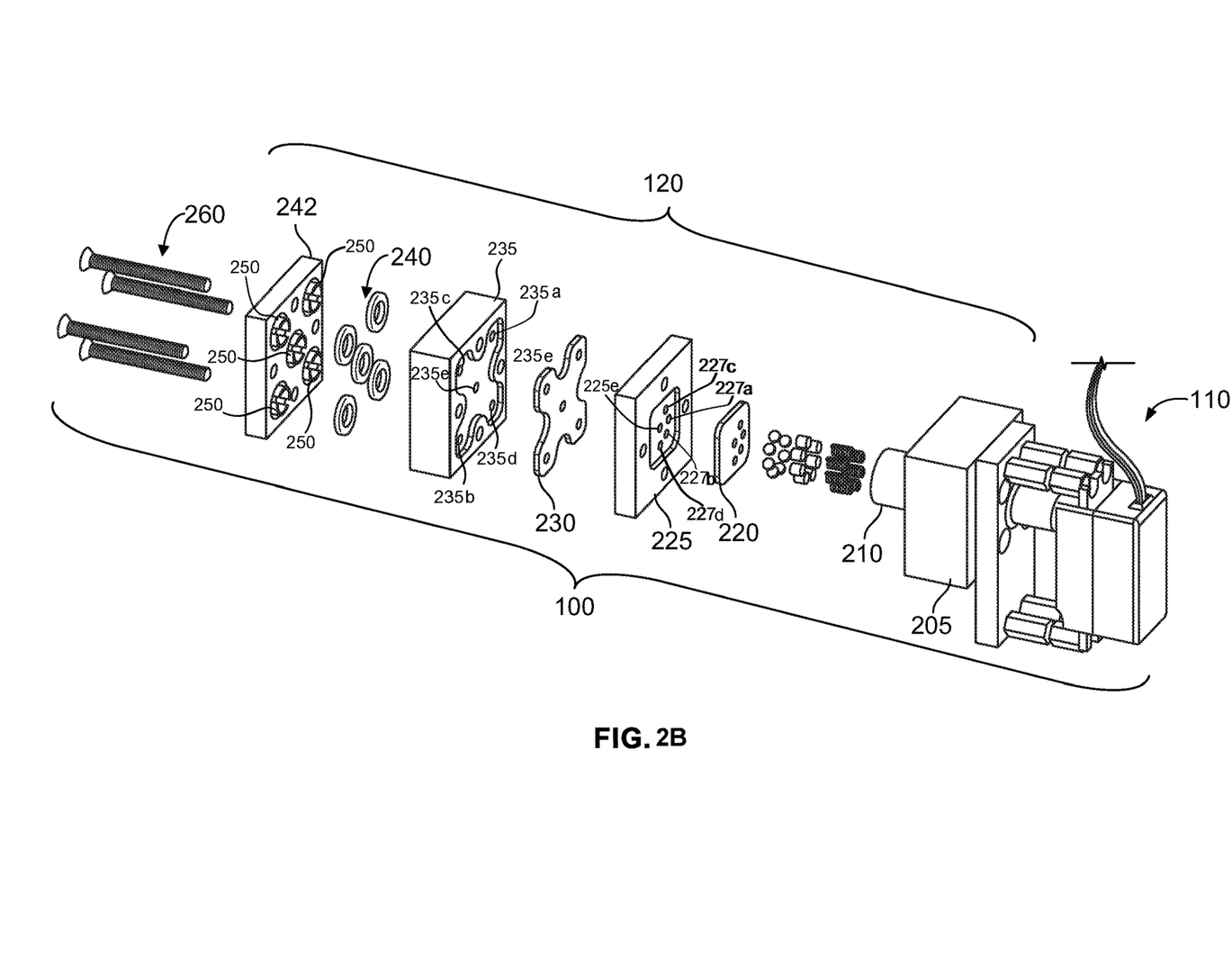
FIG. 2B is another exploded view of the valve assembly according to an embodiment.

Turning to FIGS. 2A and 2B, an exploded view of the valve assembly 100 is illustrated. FIG. 2A represents a front perspective of the exploded view of the valve assembly 100 and FIG. 2B illustrates a rear perspective of the exploded view of the valve assembly 100. The port selection assembly 120 includes a first housing 205, a barrel 210 (e.g., a servo-driven barrel), compression springs 212, billets 214, ball seals 216, a first port gasket 220 (e.g., a rubber gasket), an adapter plate 225, a second port gasket 230, a plurality of water tube sealing O-rings 240, a second housing 235, a front plate 242 (through which the holes 130 are defined) with a push-to-connect collets 250, and a plurality of screws 260 that hold the port selection assembly 120 together (via corresponding holes in the front plate 242, second housing 235, adaptor plate 225, and first housing 205). The barrel 210 is coupled to the servo assembly 110, which can rotate the barrel 210. According to an embodiment, the servo assembly 110 (e.g., a motor thereof) rotates the barrel 210 from a first rotational position to a second rotational position in order transition the valve assembly 100 from a first state (in which all of the outlet fluid paths are blocked) to second state (in which the inlet fluid path is connected to one of the outlet fluid paths via the slot) or vice versa. Additionally, in some embodiments, the servo assembly 110 can rotate the barrel 210 from a first rotational position to a second rotational position in order transition the valve assembly 100 from a first state, in which the inlet fluid path is connected to a first outlet fluid path via the slot in the barrel 210, to second state, in which the inlet fluid path is connected to a second outlet fluid path via the slot.

Figure 3A:
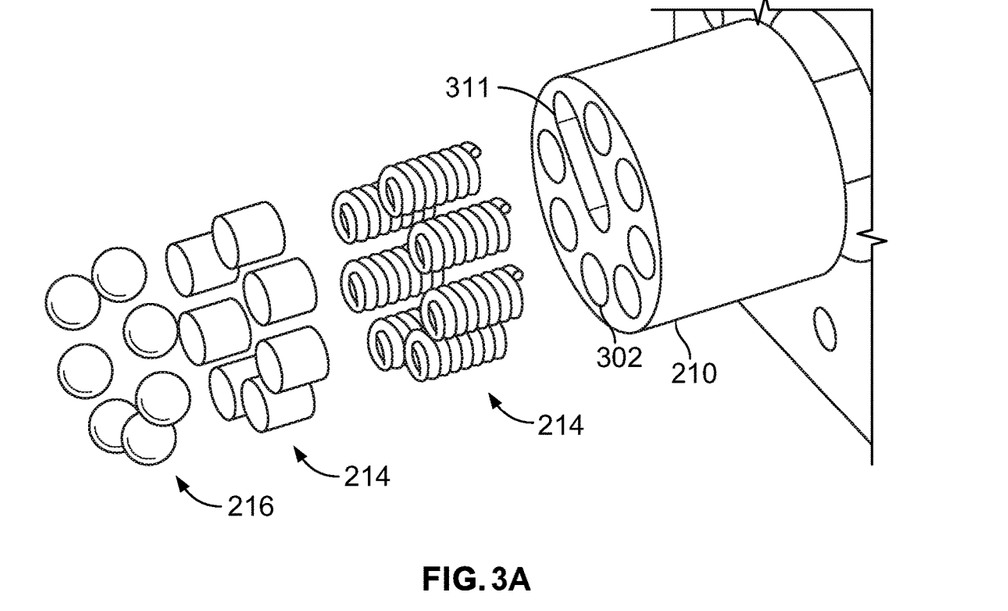
FIG. 3A is an exploded view of the barrel and surrounding components of the valve assembly of FIG. 1, according to an embodiment.
Figure 3B:
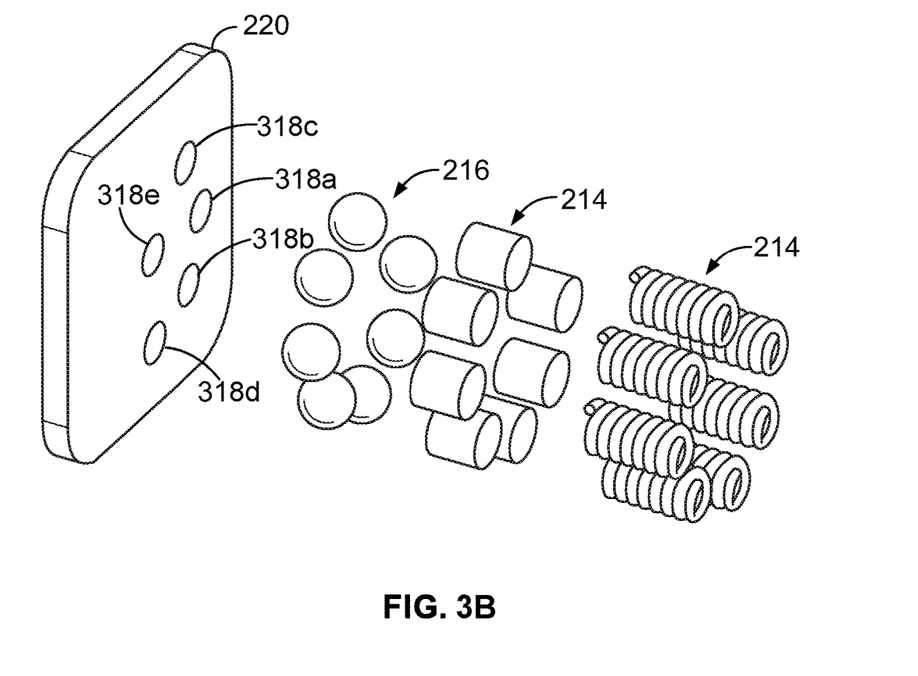
FIG. 3B is another exploded view of the barrel and surrounding components of the valve assembly, according to an embodiment.

FIGS. 3A and 3B illustrate an enlarged view of the barrel 210, compression springs 212, billets 214, ball seals 216, and first port gasket 220 of FIG. 2. In an embodiment, the barrel 210 has pockets 302 (depicted as being cylindrical) and the first port gasket 220 has holes 318a-318e defined therethrough. Each of the outwardmost holes 318a-318d serves as an outlet port along a respective outlet fluid path, while the inwardmost hole 318e serves as in inlet port along the inlet fluid path. Each of the pockets 302 is sized to contain a compression spring 212. Each pocket 302 is open at one end (shown in FIG. 3A) and closed at the other end. The open end of some of the pockets 302 is aligned with a different one of the holes 318.

In an embodiment, the barrel 210 has a slot 311 having a first portion and a second portion. The first portion (inwardmost) is aligned with the inwardmost hole 318e regardless of whether the valve assembly 100 is in a closed configuration (in which the inlet fluid path is cut off from an outlet fluid path) or an open configuration (in which the inlet fluid path is connected to an outlet fluid path). However, the second portion (outwardmost) may or may not be aligned with one of the outermost holes 318a-318d, depending on whether the valve assembly 100 is in a closed configuration or an open configuration. Specifically, when the valve assembly 100 is in a closed configuration, the barrel 210 is oriented so that the second portion is not aligned with any of the outermost holes 318a-318d. In contrast, when the valve assembly 100 is in an open configuration, the barrel 210 is oriented so that the second portion is aligned with one of the outermost holes 318a-318d. The hole 318 with which the second portion of the slot 311 is aligned corresponds to the function for which a device incorporating the valve assembly 100 is used. For example, in the context of a beverage maker, if the coffee function is selected, then the servomotor of the servo assembly 110 rotates the barrel 210 until the second portion of the slot 311 is aligned with the hole 318 leading to a coffee maker head. In effect, the slot 311 constitutes an intermediate fluid path which, when aligned with one of the outermost holes 318a-318d, connects the inlet fluid path (through the hole 318e) with one of the outlet fluid paths.

According to an embodiment, each cylindrical pocket 302 holds a compression spring 212, which is compressed between the closed end of the pocket 302 and a billet 214, such that the compression spring 212 presses against the billet 214 (which may be implemented as a small plastic piece), and (via the billet 214) against one of the ball seals 216, thereby urging the ball seal against the first port gasket 220. The outermost holes 318a-318d (which are depicted as being radially arranged) align with at least some of the pockets 302 in the barrel 210, thereby allowing the ball seals 216 to seal all of the holes 318a-318d (when the valve assembly 100 is in a closed position) or all but the one of the holes 318a-318d (when the valve assembly 100 is in an open position) with the unsealed hole corresponding to the selected outlet port 130 (which corresponds to the selected function) as the barrel 210 is rotated into the selected position (illustrated in FIGS. 3A, 3B, and 4).

According to an embodiment, the billets 214 help prevent wear on the ball seals 216 cause by the interaction between the springs 212 and the ball seals 216. The billets 214 are depicted as cylindrical in shape, but may, for example, be spherical, in which case each one functions as a secondary ball.

According to an embodiment, the slot 311 acts as a fifth pocket of the barrel 210, and allows water to flow from the middle (e.g., hot water inlet) port of the valve assembly 100 to the functional outlet port (e.g., coffee brew, tea brew, hot water, system purge, etc.) selected by the rotation of the barrel 210, which is driven by the servo assembly 110.

Referring again to FIG. 2A and FIG. 2B, the second housing 235 has holes 235a-235e defined therethrough, including holes 235a-235d located along the outlet fluid paths and a hole 235e located along the inlet fluid path. The second gasket 230 has holes 230a-230e (acting as ports) defined therethrough, including holes 230a-230d located along the outlet fluid paths and hole 230e located along the inlet fluid path. The adapter plate 225 includes slots 225a-225d (located along the outlet fluid paths) and hole 225e (located along the inlet fluid path) defined therethrough. Each slot is defined on one side of the adapter plate 225 and has a first end and a second end. The first end (the outermost end) of each slot is aligned with a corresponding hole in the second port gasket 230 and the second end (the innermost end) communicates with one of the corresponding holes 227a-227d on the other side of the adapter plate 225. Each of the holes 227a-227d is aligned with a corresponding hole in the first port gasket 220. Thus, each of the slots 225a-225d provides a channel along the outlet fluid path that serves to connect a hole on the second port gasket 230 with a hole 318 on the first port gasket 220. It is to be noted that, while the holes 250a-250d, 235a-235d, and 230a-230d along the outlet fluid path are regularly spaced at 90 degree intervals, the holes 227a-227d and 318a-318d are all on one side of the adapter plate 225 and first port gasket 220, respectively. In effect, the adapter plate 225 scales the distance between the outlet fluid paths down from a first distance to a second (and shorter) distance (thereby allowing a smaller architecture for the servo assembly 110) and translates the outlet fluid paths from a symmetric arrangement to an asymmetric arrangement (for example, to accommodate a servomotor having a limited (e.g., 180 degree) range of motion).

Figure 4:
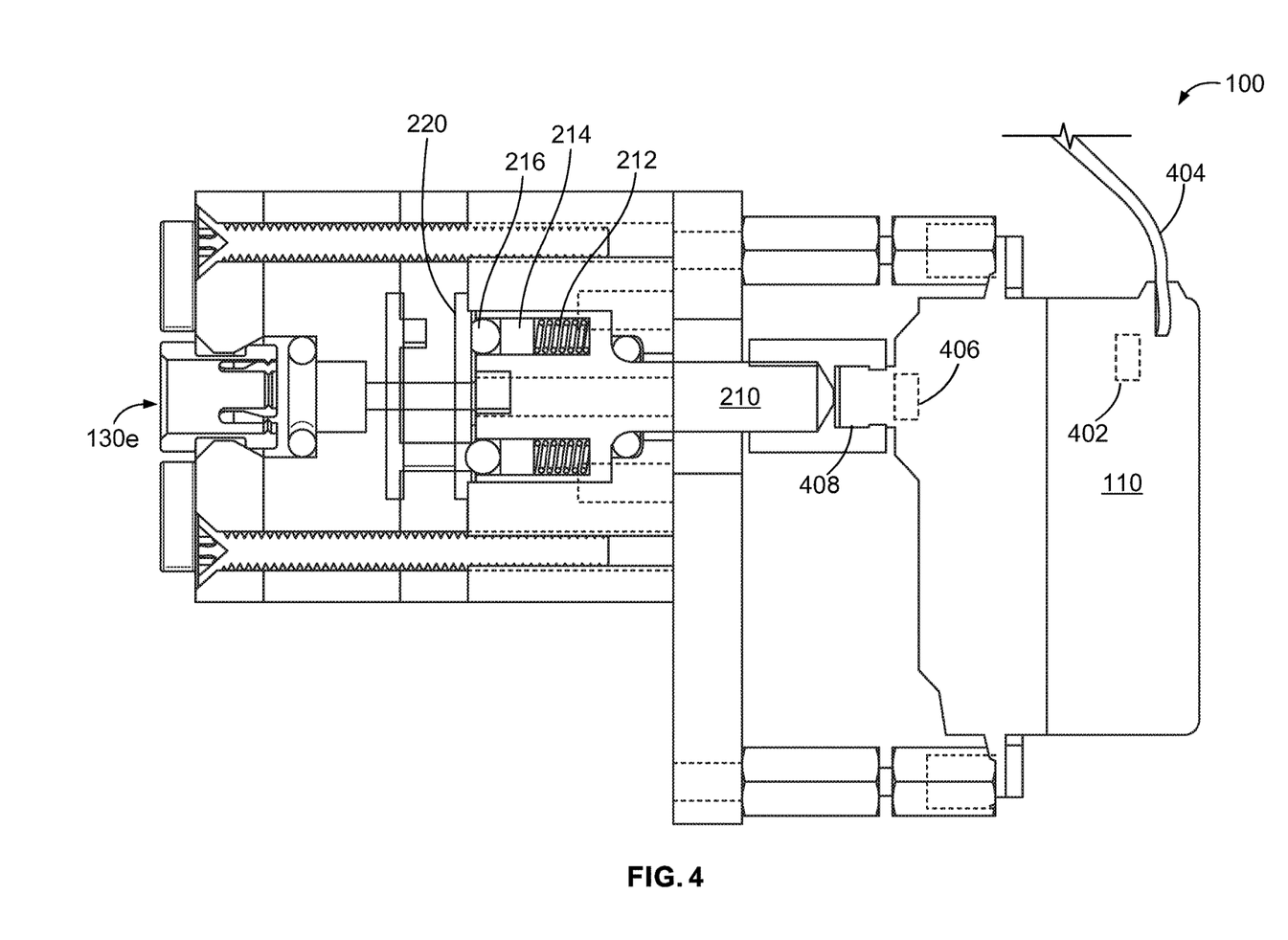
FIG. 4 is a cross-sectional view of the valve assembly, according to an embodiment.

Turning to FIG. 4, a cross-sectional view of the valve assembly 100 is disclosed. As shown, the servo assembly 110, provided, for example, at one end of, drives the barrel 210. In the illustrated embodiment, the barrel 210 houses compression spring 212, billet 214, sealing ball 216, and port 218 of the gasket 220 in each of the plurality of outlet fluid flow paths (e.g., water flow paths) of the barrel. The valve assembly 100 further includes an inlet port 130e (e.g., a hot water inlet port) at the other end.

In an embodiment, logic circuitry 402 receives signals (via a cable 404) and controls a servomotor 406 to drive a shaft 408 to rotate the barrel 210. Push-to-connect tube fittings may be integrated into the valve assembly 100 in an embodiment to further reduce costs and enable quicker and easier assembly, inspection, and maintenance. The plastic water tubes may be simply connected into the housing by pushing them into collets until seated, and disconnected by depressing the collet lip and withdrawing the tube, in accordance with one embodiment. In some embodiments, the tubes may be replaced or cut to different lengths, without any additional modification or hardware. The conventionally used fittings are much more expensive and are also more time consuming to connect and disconnect, and require additional hardware that is permanently clamped or swaged to the tubing.

The particular implementations shown and described herein are illustrative examples and are not intended to otherwise limit the scope of the disclosure in any way. The steps of all methods described herein are performable in any suitable order unless otherwise indicated herein or otherwise clearly contradicted by context. The use of any and all examples, or exemplary language (e.g., "such as") provided herein, is intended merely to better illuminate the disclosure and does not pose a limitation on scope. Numerous modifications and adaptations will be readily apparent to those skilled in this art without departing from the spirit and scope of the disclosure.

It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another.

What is claimed is:

1. A valve assembly comprising:
   a port selection assembly comprising an inlet fluid path and a plurality of outlet fluid paths;
   a servo-driven barrel comprising
      a slot that is aligned with the inlet fluid path,
      a plurality of pockets;
   a plurality of ball seals, each of which is at least partially disposed within a respective pocket of the plurality of pockets; and
   a port gasket comprising a plurality of holes, including a hole along the inlet fluid path and a respective hole along each of the plurality of outlet fluid paths,
   wherein rotation of the barrel the moves the ball seals to block or unblock one or more of the plurality of outlet fluid paths, thereby controlling the flow of fluid from inlet fluid path, through the slot, and through the outlet fluid path,
   wherein the rotation of the barrel moves the plurality of ball seals along a surface of the gasket to block or unblock one or more of the plurality of holes.

2. The valve assembly of claim 1, further comprising:
   an inlet port located at a first end of the valve assembly, wherein the inlet port defines the beginning of the inlet fluid path;
   a plurality of outlet ports located at the first end of the valve assembly, wherein each outlet port of the plurality defines the end of an outlet fluid path of the plurality of outlet fluid paths,
   wherein at least one of the plurality of outlet fluid paths has a first portion that is aligned with the an outlet port of the plurality of outlet ports and a second portion that is not aligned with the outlet port, but is aligned with a hole of the plurality of holes; and
   an adapter plate disposed between the first end and the barrel, the adapter plate comprising at least one channel that is aligned with the both the outlet port and the hole.

3. The valve assembly of claim 1, wherein the number of ball seals exceeds the number of holes in the port gasket, such that when all of the plurality of outlet fluid paths are blocked by ball seals, there is at least one ball seal that is not blocking an outlet fluid path.

4. The valve assembly of claim 1, further comprising:
   a plurality of compression springs, wherein
   each compression spring of the plurality is disposed above a ball seal within a pocket of the plurality of pockets, such that when the rotation of the barrel the moves the ball seal to block an outlet fluid path, the compression spring urges the ball seal against a hole along the outlet fluid path.

5. The valve assembly of claim 4, further comprising a plurality of billets, wherein each billet of the plurality is disposed between one of the plurality compression springs and one of the plurality of ball seals and transfers force from the compression spring to the ball seal.

6. The valve assembly of claim 1, further comprising:
   an inlet port located at a first end of the valve assembly, wherein the inlet port defines the beginning of the inlet fluid path; and
   a plurality of outlet ports located at the first end of the valve assembly, wherein each outlet port of the plurality defines the end of an outlet fluid path of the plurality of outlet fluid paths.

7. The valve assembly of claim 6, further comprising:
   a plurality of collets, wherein one of the plurality of collets is disposed around the periphery of the inlet port and each of the rest of the collets of the plurality is disposed around the periphery of an outlet port of the plurality of outlet ports.

8. The valve assembly of claim 6, wherein each of the plurality of outlet ports corresponds to a different function of a beverage maker.

9. The valve assembly of claim 8, wherein the inlet port receives an inlet flow of hot water.

10. The valve assembly of claim 1, further comprising:
    a servomotor coupled to the barrel; and
    logic circuitry that controls the servomotor to rotate the barrel in order to select an outlet fluid path of the plurality of outlet fluid paths to be active.

11. A valve assembly having a first state and a second state, the valve assembly comprising:
    an inlet fluid path;
    an outlet fluid path;
    a ball seal;
    a port gasket;
    a barrel that presses the ball seal against a surface of the port gasket that includes a hole along the inlet fluid path and a hole along the outlet fluid path,
    wherein the barrel includes a slot that at least partially overlaps the hole along the inlet fluid path,
    wherein when the valve assembly is in the first state,
       the ball seal is in a first position so as to block the hole along the outlet fluid path, thereby preventing fluid from flowing from the inlet fluid path to the outlet fluid path, the barrel is in a first rotational position, in which the slot is not aligned with the hole along the outlet fluid path; wherein when the valve assembly is in the second state, the barrel is in a second rotational position, in which the slot is at least partially aligned with the hole along the outlet fluid path, the ball seal is in a second position so that it does not block the hole along the outlet fluid path, thereby permitting fluid to flow from the inlet fluid path, through the slot, and through the outlet fluid path, wherein when the valve assembly switches from the first state to the second state, the barrel rotates relative to the surface thereby moving the ball seal from the first position to the second position and moving the slot from the first rotational position to the second rotational position, wherein the rotation of the barrel moves the ball seal along the surface of the port gasket to block or unblock the hole along the inlet fluid path.

12. The valve assembly of claim 11,
wherein the barrel has a pocket defined therein and the ball seal is disposed at least partially within the barrel, the valve assembly further comprising a compression spring disposed inside the pocket above the ball seal,
wherein the barrel presses the ball seal against the surface via the compression spring.

13. The valve assembly of claim 11, further comprising:
a plurality of compression springs, wherein
each compression spring of the plurality is disposed above a ball seal within a pocket of a plurality of pockets, such that when the rotation of the barrel the moves the ball seal to block an outlet fluid path, the compression spring urges the ball seal against a hole along the outlet fluid path.

14. The valve assembly of claim 11, further comprising:
a servomotor coupled to the barrel; and
logic circuitry that controls the servomotor to rotate the barrel in order to select an outlet port of a plurality of outlet ports to be active.

\* \* \* \* \*